United States Patent
Jabourian et al.

(10) Patent No.: US 12,034,842 B2
(45) Date of Patent: *Jul. 9, 2024

(54) ANTI-COUNTERFEITING SYSTEM AND METHOD OF USE

(71) Applicants: Vicken Jabourian, Las Vegas, NV (US); Shant Jabourian, Las Vegas, NV (US)

(72) Inventors: Vicken Jabourian, Las Vegas, NV (US); Shant Jabourian, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,339

(22) Filed: Jul. 5, 2023

(65) Prior Publication Data

US 2023/0353353 A1 Nov. 2, 2023

Related U.S. Application Data

(63) Continuation of application No. 17/808,362, filed on Jun. 23, 2022, now Pat. No. 11,736,287, which is a continuation of application No. 16/580,476, filed on Sep. 24, 2019, now Pat. No. 11,405,194.

(51) Int. Cl.
| | |
|---|---|
| *H04L 9/08* | (2006.01) |
| *B42D 25/305* | (2014.01) |
| *G06F 21/44* | (2013.01) |
| *G06F 21/73* | (2013.01) |
| *G06K 7/14* | (2006.01) |
| *G06K 19/06* | (2006.01) |
| *G06Q 30/018* | (2023.01) |
| *H04L 9/00* | (2022.01) |
| *H04L 9/32* | (2006.01) |

(52) U.S. Cl.
CPC .......... *H04L 9/0866* (2013.01); *B42D 25/305* (2014.10); *G06F 21/73* (2013.01); *G06K 7/1404* (2013.01); *G06K 19/06009* (2013.01); *G06Q 30/018* (2013.01); *G06Q 30/0185* (2013.01); *H04L 9/3226* (2013.01); *H04L 9/3236* (2013.01); *H04L 9/50* (2022.05); *H04L 2209/56* (2013.01)

(58) Field of Classification Search
CPC ... H04L 9/0866; H04L 9/3226; H04L 9/3236; H04L 9/50; H04L 2209/56; H04L 9/002; H04L 9/3239; B42D 25/305; G06F 21/73; G06F 21/44; G06K 7/1404; G06K 19/06009; G06Q 30/018; G06Q 30/0185
See application file for complete search history.

(56) References Cited

U.S. PATENT DOCUMENTS

| | | | |
|---|---|---|---|
| 6,650,346 B1 | 11/2003 | Jaeger et al. | |
| 10,002,317 B1 | 6/2018 | Nauman | |
| 10,977,534 B1 | 4/2021 | Mercolino | |
| 11,593,576 B1 * | 2/2023 | Nemeth | H05K 1/0268 |
| 2003/0120613 A1 | 6/2003 | Neogi | |
| 2004/0054888 A1 | 3/2004 | Chester | |
| 2005/0097054 A1 * | 5/2005 | Dillon | G06Q 10/08 705/51 |
| 2006/0091670 A1 | 5/2006 | Gaynor | |
| 2006/0095778 A1 | 5/2006 | He et al. | |
| 2006/0124574 A1 | 6/2006 | Yousif et al. | |
| 2006/0235805 A1 | 10/2006 | Peng et al. | |
| 2007/0022294 A1 * | 1/2007 | Lapstun | G06F 16/9554 713/176 |
| 2007/0086345 A1 | 4/2007 | Yashima et al. | |
| 2008/0129037 A1 | 6/2008 | Roth et al. | |
| 2008/0140432 A1 * | 6/2008 | Fenn | G06Q 10/087 705/317 |
| 2008/0169926 A1 | 7/2008 | Reep | |
| 2008/0253560 A1 | 10/2008 | Grant | |
| 2009/0158946 A1 | 6/2009 | Roth et al. | |
| 2009/0220072 A1 | 9/2009 | Schneider | |
| 2010/0001862 A1 | 1/2010 | Wilson et al. | |
| 2010/0033300 A1 | 2/2010 | Brandin | |
| 2010/0043694 A1 | 2/2010 | Patel | |
| 2010/0181371 A1 | 7/2010 | Messmer et al. | |
| 2010/0327060 A1 | 12/2010 | Moran et al. | |
| 2011/0020641 A1 | 1/2011 | Shroff et al. | |
| 2011/0251969 A1 * | 10/2011 | Gogo | G06Q 30/06 206/532 |
| 2012/0021188 A1 | 1/2012 | White et al. | |
| 2013/0024387 A1 | 1/2013 | Dillon et al. | |

(Continued)

FOREIGN PATENT DOCUMENTS

| | | |
|---|---|---|
| EP | 3349164 A1 | 7/2018 |
| WO | 2018026727 A1 | 2/2018 |
| WO | 2019027529 A1 | 2/2019 |

OTHER PUBLICATIONS

"Watch out for Fake Cannabis Labels, Green Rush Packaging". Green Rush Packaging, https://greenrushpackaging.com/cannabis-blog/watch-out-for-fake-cannabis-labels/, Jul. 1, 20198, retrieved Feb. 23, 2024. (Year: 2019).*

*Primary Examiner* — Darren B Schwartz

(74) *Attorney, Agent, or Firm* — Lerner David LLP

(57) ABSTRACT

A method for associated at least one tamper-proof seal with an anti-counterfeiting system, allowing that system to verify the provenance of an associated item, and said system itself is provided for. By generating a series of serial numbers, hashes, verification codes, fixing said serial number and verification code to a tamper proof seal, and providing a means for a user to check those codes against a corresponding computerize database, a system and method for allowing an end-user to check the provenance of a real-world good is disclosed.

9 Claims, No Drawings

(56) References Cited

U.S. PATENT DOCUMENTS

| | | |
|---|---|---|
| 2013/0320079 A1* | 12/2013 | Nordin ............... G06Q 10/0832 |
| | | 235/375 |
| 2014/0201094 A1 | 7/2014 | Herrington et al. |
| 2014/0252077 A1 | 9/2014 | Corby |
| 2015/0072097 A1 | 3/2015 | Tobol et al. |
| 2015/0117701 A1 | 4/2015 | Ross et al. |
| 2015/0134552 A1 | 5/2015 | Engels et al. |
| 2016/0027021 A1* | 1/2016 | Kerdemelidis ...... G06Q 30/018 |
| | | 705/317 |
| 2016/0296810 A1* | 10/2016 | Mandel ................. H04B 5/77 |
| 2017/0083731 A1 | 3/2017 | Sanwald et al. |
| 2017/0228742 A1* | 8/2017 | Aljawhari .......... G06Q 30/0185 |
| 2017/0237553 A1* | 8/2017 | Sriram ................. H04L 9/3242 |
| | | 705/333 |
| 2017/0262862 A1 | 9/2017 | Aljawhari |
| 2018/0019872 A1 | 1/2018 | Radocchia et al. |
| 2018/0096175 A1 | 4/2018 | Schmeling et al. |
| 2018/0108024 A1 | 4/2018 | Greco et al. |
| 2018/0204034 A1 | 7/2018 | Tonnelier |
| 2018/0276522 A1* | 9/2018 | Coronado ........ G06K 19/07726 |
| 2018/0350272 A1 | 12/2018 | Hill et al. |
| 2019/0044700 A1 | 2/2019 | Leddy |
| 2019/0260592 A1 | 8/2019 | Nguyen et al. |
| 2019/0303600 A1 | 10/2019 | Hamel et al. |
| 2019/0312734 A1 | 10/2019 | Wentz et al. |
| 2019/0367239 A1* | 12/2019 | Camenisch ............ B65D 79/02 |
| 2020/0076786 A1* | 3/2020 | Spivack ............... B42D 25/328 |
| 2020/0394372 A1 | 12/2020 | Fontaine |
| 2021/0006399 A1* | 1/2021 | Lee ......................... H04L 9/30 |

\* cited by examiner

ANTI-COUNTERFEITING SYSTEM AND METHOD OF USE

CLAIM OF PRIORITY

This application is a continuation of U.S. patent application Ser. No. 17/808,362, entitled "ANTI-COUNTERFEITING SYSTEM AND METHOD OF USE", filed on Jun. 23, 2022, which is a continuation of U.S. patent application Ser. No. 16/580,476, entitled "ANTI-COUNTERFEITING SYSTEM AND METHOD OF USE", filed on Sep. 24, 2019, the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to an anti-counterfeiting system and method of use. In particular, the present disclosure provides for an anti-counterfeiting system to be used by members of the public to verify the provenance of the goods of others.

BACKGROUND

Products are shipped every day across the country and across the world. Ensuring that products arrive safely and to the proper location is a key factor in the transportation of goods. Another important factor are anti-counterfeiting measures taken during transport. Guaranteeing the authenticity of a product is extremely valuable to build trust in the consumer. A secure database incorporating all of this information is necessary to have every aspect of the product documented. From origin to final destination, any product, especially consumable goods, should be securely tracked with its authenticity able to be monitored. Many companies provide various methods to ensure the authenticity of products to manufacturers.

Many of these methods, while greatly needed, do not come without faults. Radio-frequency identification (RFID) is commonly used to track products and to ensure authenticity. RFID tracking can be very expensive and complex to use. The system is also prone to breakdowns because of circuit failures or signal interference. It is important to have an authenticator that is both easy to use and reliable. It is also crucial for a tracking system to be able to be updated should something happen. If there is a product recall, it is necessary that a recall warning can be programmed into the tracking number to alert consumers and pull the product. Many of the current systems do not have the ability to update their anti-counterfeit devices once placed on the product. Further, it is extremely important to be able to track consumable goods. When a consumer is ingesting something, they should be able to know exactly where it is coming from. For example: if something is labeled organic, the consumer should be able to track the product back to the farm it came from. Public health can be severely at risk if certain goods are not properly monitored.

Tracking numbers used for anti-counterfeiting and authentication purposes are crucial to ensure that consumers are getting the products they actually purchased. Counterfeiters can simply duplicate the serial numbers used or even predict the next numbers in the line to use. A system is needed that provides less predictability in the number sequence. Additionally, the validation system when checking the authenticity code must be secure. Often, it is easy for counterfeiters to mess with the system to have their products register as authentic. This type of system needs to be unable to be spoofed. A method should not be susceptible to attack just by seeing the actual method. A secure database and authentication code should be able to remain secure regardless of whether or not the method is accessible. A system that is less expensive, more reliable, and more secure would be of great benefit to both consumers and manufacturers.

SUMMARY

A method for associating at least one tamper-proof seal with an anti-counterfeiting system, allowing that system to verify the provenance of an associated item, and said system itself is provided. In a preferred embodiment, when an entity, such as manufacturer, orders new tamper-proof seals to be used on their real-world tangible products, new serials and their corresponding verification codes are generated for the seals by a server, are then grouped into rolls, and are subsequently added to the entity's account in the computerized database. The entity then secures their physical product packages with the tamper-proof seals, then logs into the system via a web portal and enters the range of serials to activate. The entity then assigns product information to some selected serials by either directly entering the data or selecting from pre-saved product information. The entity then activates the selected serial numbers with the assigned product information. The secured packages are then distributed to various channels such as distributors and retail shops.

When an end-user, such as a consumer, purchases one of the secured products, they can scan an optical identifier on the tamper-proof seal to display the product information, along with an input field for a verification code to complete the verification process. The end user takes action to reveal the verification code and enters the code in the input field. A success message is then displayed to the consumer confirming the product is authentic.

The present disclosure provides for a method for associating at least one tamper-proof seal with an anti-counterfeiting system. In a highly preferred embodiment, the method begins by programmatically generating a plurality of complete serial numbers by providing an amount of serial numbers to generate, and appending or prepending one or more random letters to each of the numeric serial numbers to generate each complete serial number. The method continues to hash, each of the complete serial numbers via a hashing algorithm. The method then converts these hashes into a corresponding hex value or other type of text encoding, such as ASCII and base64. Verification codes for each of the complete serial numbers are generated, where the verification code is random.

This plurality of complete serial numbers is then grouped into a batch, and each complete serial number and its respective verification code are uploaded into a computerized database. From there, a plurality of tamper-proof seals are prepared, where each tamper-proof seal corresponds to one of the plurality of complete serial numbers, and bears a verification code associated with the corresponding complete serial number, where the verification code is obscured by a removable material.

In other embodiments, the method continues to combine the plurality of tamper-proof seals into a roll and generates a computer-readable electronic data file containing the complete serial number and verification code for each of the plurality of tamper-proof seals combined into said roll. The method may then continue to provide a private key to an entity and then subsequently associate the roll and the computer-readable electronic data file with the entity, within the computerized database. In many embodiments, the computerized database employs blockchain technology.

In yet another embodiment, the method comprises different, but similar steps. For example, the method can be performed by first programmatically generating a plurality of complete serial numbers by providing an amount of serial numbers to generate and appending or prepending one or more random letters to each of the randomly generated numeric serial numbers to generate each complete serial number. The method may then hash, via a hashing algorithm, each of the complete serial numbers. From there, these hashes are converted into a hex value in a one-to-one relationship. A verification code for each of the complete serial numbers is generated, where the verification code is random. The plurality of complete serial numbers is then grouped into a batch.

After that step, each complete serial number and its respective verification code are uploaded to a computerized database, which may or may not utilize blockchain technology, depending on the embodiment. The method proceeds to prepare a plurality of tamper-proof seals, where each tamper-proof seal corresponds to one of the plurality of complete serial numbers, and a verification code associated with the corresponding complete serial number is affixed thereto, where the verification code is obscured by a removable material. From there, the plurality of tamper-proof seals are combined into a roll and a computer-readable electronic data file containing the complete serial number and verification code for each of the plurality of tamper-proof seals combined into said roll is generated. After this electronic data file is generated, a plurality of data fields pertaining to a product are added to the computerized database, by an entity which is preferably a third party. The plurality of data fields is then associated with the batch within the computerized database. Subsequently, an entity, which is preferably a third party, will activate a predetermined amount of complete serial numbers contained on the roll, by the entity and will affix at least one tamper-proof seal to a physical embodiment of the product. Finally, the complete serial number affixed to at least one tamper-proof seal will be entered into a web portal operatively connected to the computerized database, completing the registration/activation portion of the method.

To verify the authenticity of a product with a tamper-proof seal there affixed, a party, preferably a consumer, will unobscure the verification code affixed to the tamper-proof seal, enter said verification code into the web portal, and will verify the entered verification code against the corresponding verification code in the computer-readable electronic data file. The computerized database will then return an indication of the product's provenance, if the entered verification code and the corresponding verification code in the computer-readable electronic data file are equivalent. While many types of data can be used in the aforementioned plurality of data fields, in a preferred embodiment, said data fields include: name, quantity, product description, vendor, images, lab results, and metadata. In other embodiments, these data fields are mutable and in other, still embodiments, each of the complete serial numbers are single-use. That is, once verified through the method, they cannot be used again on future products.

The present disclosure also contemplates an anti-counterfeiting system. In one embodiment, the system comprises a plurality of complete serial numbers, a plurality of hex values, a plurality of corresponding verification codes, a plurality of tamper-proof seals, a computerized database, and an internet-enabled means for an end-user to verify a complete serial number and corresponding verification code against the computerized database.

Preferably, for the plurality of complete serial numbers, each complete serial number comprises a numeric value with at least one randomly generated letter prepended or appended to the numeric value. For the plurality of hex values, said values correspond to the plurality of complete serial numbers in a one-to-one relationship, each of the hex values comprising a hash of the corresponding complete serial number. The plurality of verification codes corresponds to the plurality of hex values in a one-to-one relationship, each of the verification codes comprising a random sequence. Note that in various embodiments, other types of text encoding can be used in lieu of the hex value, such as ASCII or base64.

The plurality of tamper-proof seals corresponds to the plurality of complete serial numbers and plurality of verification codes, each seal having a top surface and a bottom surface, wherein the top surface is at least partially coated with a holographic material, a verification code, and a removable film to obscure the verification code, and the back surface being coated with an adhesive. The computerized database has computer-readable electronic data file containing the complete serial number and verification code for each of the plurality of tamper-proof seals. This database may, or may not utilize blockchain technology, depending on the embodiment chosen. Finally, the internet-enabled means for an end-user to verify the complete serial number and verification code contained on one of the plurality of tamper-proof seals against the computer-readable electronic data file should be available via a smartphone app, web portal, or other equivalent operative connection means via the internet. In one preferred embodiment, the tamper-proof seal further comprises a scannable optical identifier associated with one complete serial number.

The present disclosure addresses at least one of the foregoing disadvantages described in the background. However, it is contemplated that the present disclosure may prove useful in addressing other problems and deficiencies in a number of technical areas. Therefore, the claims should not necessarily be construed as limited to addressing any of the particular problems or deficiencies discussed hereinabove.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions and the claims.

DETAILED DESCRIPTION OF THE PREFERRED EMBODIMENTS

The present disclosure contemplates a system and method for allowing entities to associate their products, through specialized tamper-proof seals, with an electronic database that may be accessed by end-users to check the provenance of said products.

In most embodiments of the method in accordance with the present disclosure, the method begins by generating complete serial numbers. Preferably, an incrementing sequence of numbers is generated programmatically by providing a starting number and the number of serials to generate. This can be performed by an associated server or unassociated processing system. As each serial number is recorded, a set of random letters are appended or prepended to each serial. Preferably, this is performed using a cryptographically secure random number generator. After the set of random letters are appended or prepended to a serial to create one or more complete serial numbers a hashing algorithm is applied to the complete serial number and is subsequently converted to hex, or some other type of value generated through the use of text encoding. Preferably, this hashing algorithm is an HMAC algorithm, and preferably a SHA256 hashing algorithm. In a variety of embodiments, serial numbers are generated at the time-of-production, and are only stored in an Internet-accessible location when they are added to an entity's account. As an added security measure, in these embodiments, unassigned serial numbers are not stored in an Internet-accessible location to aid against the unauthorized capture of yet-to-be-generated serial numbers.

To generate a corresponding verification code, a portion of the generated hex value is used. Preferably, this is the first four digits of the hex value, but other portions of said hex value may be used as well. In alternate embodiments, the verification code is purely random, generated by a cryptographically secure random number generator. This has the benefit of enhanced security, by preventing the generation of valid serials and verifications codes even if the secret key becomes compromised.

Each complete serial number belongs to a batch, where a batch is assigned to a single entity. A batch has a one-to-many relationship with complete serial numbers, while a complete serial number has a one-to-one relationship with a batch. An electronic data file, containing at least three columns pertaining to a complete serial number, a corresponding verification code, and a batch name is created and uploaded to an admin electronic database, which results in a new record for the batch being created and added to a batch table within the admin electronic database. All new records for all complete serial numbers in that batch are added to a complete serial number table, and subsequently associates those complete serial numbers to the batch with a foreign key.

In various embodiments, when an entity purchases a new batch of complete serial numbers, the records from the batch table and the records from the complete serial number table get copied into a member electronic database. Further, the batch as well as each individual complete serial number gets associated with the entity via the foreign key.

After the batch and each individual complete serial number get associated with an entity, the entity may perform a variety of actions on the member electronic database, either on an individual complete serial number or a batch of complete serial numbers. Adding or updating information associated with a complete serial number can be done in one of two ways: through the use of a template or through the direct entry of information.

Templates allow an entity to save a plurality of data fields pertaining to product information for easy association with the complete serial numbers without the entity needing to re-enter the information. This is particularly helpful for entities who sell a large amount of products. In a highly preferred embodiments, the plurality of data fields include: template name, product name, product quantity, product description, vendor, images, and other metadata such as lab results. An entity enters template data then saves said template to the members electronic database. When a template is saved, a new record is created in a templates table located on said members electronic database. A template has a one-to-many relationship with complete serial numbers, while a complete serial number has a one-to-one relationship with a template and is associated to a template with a foreign key. In a preferred embodiment, templates can be edited and changed by the entity at any point-in-time. If a template has been updated, any current activated complete serial numbers with an association to that template will display the updated information within the template.

In lieu of a template, product information can be associated with one or more complete serial numbers directly. When product information is added directly to a single or group of complete serial numbers, the product information is saved directly in the serial record(s) in the serials table. Serials can also be activated or deactivated at this same time. Preferably, the plurality of data fields that an entity can directly enter include: product name, product quantity, product description, vendor images, and other metadata such as lab results. If any product information is entered directly and a template is chosen at the same time, the information saved directly will have priority and will be displayed to the public and will fall back to the template data for any fields with data not entered directly. Directly entered product information can be edited and changed at any point in time.

In a number of embodiments, the admin and/or member electronic database employs blockchain technology. Preferably, an entity has the ability to enable or disable blockchain support at any time. When an entity enables blockchain support for the first time, a new Ed25519 keypair is generated for the entity and stored in the member electronic database, to allow posting of transactions on the blockchain.

When activating a serial, an entity can either activate an entire batch or a select group of complete serial numbers. In one embodiment, complete serial numbers can also be activated at the time of adding or updating one of the plurality of data fields. If blockchain support is enabled for the entity, one additional step occurs after updating the serial(s) record(s). A new job is added to a work queue for each selected complete serial number, with the task of recording the new status on the blockchain. If the serial doesn't exist or is not registered on the blockchain, a new transaction is created using the user's keypair and records the immutable complete serial number, the mutable activation status, the mutable activation timestamp, and other mutable metadata such as notes or recall warnings on the blockchain. The transaction ID is subsequently recorded in the serial(s) record(s) in the members electronic database for reference.

If the complete serial number exists or is currently registered on the blockchain, a new transaction is created using the user's keypair with a pointer to the latest transaction ID (obtained from the serial(s) record(s) in the traditional database) of that serial and records the new activation status, activation timestamp, and other metadata such as notes or recall warnings on the blockchain. The new transaction ID is then recorded in the serial(s) record(s) (in the traditional database) for reference. The entire transaction history of a complete serial number can be viewed on the blockchain.

To deactivate a serial, the entity selects a single complete serial number or a group of complete serial numbers and indicates in the member electronic database that said complete serial number(s) are to be deactivated. If blockchain support is enabled for the entity, one additional step occurs. A new job is added to a work queue for each selected serial with the task of recording the new status on the blockchain. If the serial doesn't exist or is not registered on the blockchain, nothing is recorded on the blockchain. A complete serial number is only registered for the first time on the blockchain when it is activated, not deactivated.

If the complete serial number exists or is currently registered on the blockchain, a new transaction is created using the entity's keypair with a pointer to the latest transaction ID, which is obtained from the complete serial number record(s) in the member electronic database, of that serial and records the new activation status, activation timestamp, and other metadata such as notes or recall warnings on the blockchain. The new transaction ID is then recorded in the complete serial number record(s) in the member electronic database for reference.

To verify a complete serial number, a two-step process occurs. The first step involves scanning an optical identifier such as a QR code or other 2D or 3D data matrix code displayed on the tamper-proof seal. Preferably the tamper-proof seal is holographic and contains an obscured verification code. In other embodiments, an end-user may enter the serial number displayed on the tamper-proof seal manually on a smartphone or handheld or desktop computer device using some type of keyboard input (hardware or software). In the case of scanning the QR code, the end-user uses any QR code reader application to read the QR code on the tamper-proof seal, which then makes a request to the member electronic database server via the URL encoded in the QR code or other optical identifier. The associated server then processes the request and queries the member electronic database for the complete serial number. If the proper conditions are met (i.e., the complete serial number exists and is active), the system in accordance with the present disclosure returns the product information to be displayed on the handheld device, along with an input field to complete the second step of the verification process. A log of the "view" activity is then recorded to the database, including metadata such as location of the verification request. If the conditions are not met, an error message is returned by the system to be displayed to the end-user. In a highly preferred embodiment, the optical identifier is scanned by a software application that is part of the system in accordance with the present disclosure, which utilizes additional anti-counterfeiting safeguards such as checking the format and pattern of the encoded URI as well as the format and pattern of the complete serial number contained in the URI.

The second step of the verification process includes revealing an obscured verification code located on the tamper-proof seal. Preferably this is revealed by scratching a scratch-off area to unobscure the code on the tamper-proof seal. The unobscured verification code is then entered in a web portal operatively connected to the member electronic database and the admin electronic database. When the unobscured verification code is entered and submitted, a request is made to the system in accordance with the present disclosure, where the request is processed by querying the admin and member electronic databases for that complete serial number and subsequently checks the record to make sure the conditions are met (i.e., the submitted verification code matches what is contained in the complete serial number table) and returns a success message to be displayed to the end-user via the web portal. A log of the verification activity is then recorded to the database, including metadata such as location. If the verification code does not match, a message is returned to be displayed to the end user via the web portal, informing the end-user of the lack of provenance of their purchased product.

In an alternate embodiment, the verification process can be performed in a different manner. In this embodiment, the system generates the HMAC of the complete serial number at the time of the verification request which is compared to the entered value. If there is a match, a success message is returned to the end-user to be displayed through the web portal. If the submitted code doesn't match the generated HMAC, an error message is returned. The benefit of this system is the ability to not store verification codes in the electronic database. Should said database be compromised, only the complete serial numbers would be able to be extracted and not the verification codes.

If blockchain support is enabled, one additional step occurs during the first part of the verification process. When an end-user begins the verification request, the system processes the request and queries the database to make sure the proper conditions are met (i.e., that the complete serial number exists and is active), and in addition, retrieves the latest blockchain transaction ID from the serial record in the member electronic database. The server then queries the blockchain for that transaction ID and compares the activation status on the blockchain with the status in that complete serial number's record in the member electronic database. If the statuses and timestamps on both the blockchain and member electronic database match, the product information is returned to be displayed, along with an input field to complete the second step of the verification process. If the activation status and timestamps don't match, an error message is returned to the end-user.

Various embodiments exist where complete serial numbers are single-use. That is, when enabled, if a serial has been verified one or more times using the verification code, any subsequent attempts at scanning the optical identifier on the tamper-proof seal, entering the serial number manually via keyboard input, or re-submission of the verification code results in an error message being displayed to the end-user. When the request is made to the server to validate a complete serial number, the server processes the request and queries the database for the serial number data, including view and verification count. The system's application logic then compares the verification count to the set threshold, and if the verification count is greater or equal to the threshold, the system returns an error message to be displayed to the end-user via a web portal.

In yet another embodiment, the system is configured to provide real-time, active monitoring of the tamper-proof seals, providing both entities and end-users with alerts of select events in real-time. Such events can include anomalies in serial activity such when a serial reaches a set threshold of views or when a tamper-proof seal is scanned or verified in a specific region.

In a highly preferred embodiment, the tamper-proof seal comprises serialized heat shrink wrapping.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, "a first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented an anti-counterfeiting system and method of use. In particular, the present disclosure provides for an anti-counterfeiting system to be used by members of the public to verify the provenance of the goods of others. The disclosure is illustrated by example in the drawing FIGURES, and throughout the written description. It should be understood that numerous variations are possible, while adhering to the inventive concept. Such variations are contemplated as being a part of the present disclosure.

What is claimed is:

1. A method for associating at least one tamper-proof seal with an anti-counterfeiting system, comprising the steps of:
   programmatically generating a plurality of complete serial numbers;
   hashing, via a hashing algorithm, each of the complete serial numbers to create a corresponding hash;
   randomly generating a plurality of verification codes, each verification code from the plurality of verification codes generated to correspond to a different complete serial number from the plurality of complete serial numbers;
   uploading the plurality of complete serial numbers and the plurality of verification codes to a computerized database; and preparing a plurality of tamper-proof seals, each seal corresponding to a given complete serial number from the computerized database;

affixing a corresponding verification code from the computerized database to one of the plurality of tamper-proof seals, said tamper-proof seal having the given complete serial number from the computerized database; and repeating for each complete serial number in the computerized database.

2. The method of claim 1, wherein the corresponding verification code is obscured by a removable material.

3. The method of claim 1, wherein the computerized database utilizes blockchain technology.

4. A method for validating the provenance of a product, comprising the steps of:

programmatically generating a plurality of complete serial numbers;

hashing, via a hashing algorithm, each of the plurality of complete serial numbers, to create a hash;

converting the hash into a hex value;

randomly generating a plurality of verification codes, each verification code from the plurality of verification codes being generated to correspond to a different complete serial number from the plurality of complete serial numbers;

uploading the plurality of complete serial numbers and the plurality of verification codes to a computerized database;

preparing a plurality of tamper-proof seals, each tamper-proof seal of the plurality of tamper-proof seals corresponding to a given complete serial number from the computerized database;

affixing a corresponding verification code from the computerized database to one of the tamper-proof seals of the plurality of tamper-proof seals, said tamper-proof seal having the given complete serial number from the computerized database, where the corresponding verification code is obscured by a removable material, and repeating for each complete serial number in the computerized database;

generating a computer-readable electronic data file containing the complete serial number and a respective verification code for each of the plurality of tamper-proof seals;

adding a plurality of data fields pertaining to a product to the computerized database, by an entity;

activating a predetermined amount of complete serial numbers contained on a roll, by the entity;

affixing at least one tamper-proof seal of the plurality of tamper-proof seals to a physical product;

entering the complete serial number affixed to the tamper-proof seal after affixing the at least one tamper-proof seal to the physical product into a web portal operatively connected to the computerized database;

unobscuring the verification code affixed to the tamper-proof seal affixed on the product;

entering the unobscured verification code into the web portal;

verifying the unobscured verification code against the respective verification code in the computer-readable electronic data file; and returning and indication of the product's provenance, if the unobscured verification code and the respective verification code in the computer-readable electronic data file are equivalent.

5. The method of claim 4, wherein the plurality of complete serial numbers are single-use.

6. The method of claim 4, wherein the computerized database utilizes blockchain technology.

7. An anti-counterfeiting system, comprising:

a plurality of complete serial numbers;

a plurality of hex values corresponding to the plurality of complete serial numbers in a one-to-one relationship, each of the hex values comprising a hash of the corresponding complete serial number;

a plurality of verification codes corresponding to the plurality of hex values in a one-to-one relationship;

a plurality of tamper-proof seals corresponding to the plurality of complete serial numbers and plurality of verification codes, each of the plurality of tamper-proof seals having a top surface at least partially coated with a material containing the verification code, and a removable film to obscure the verification code;

a computerized database having a computer-readable electronic data file containing the complete serial number and the verification code for each of the plurality of tamper-proof seals; and an internet-based verification system for an end user to verify the complete serial number and the verification code contained on one of the plurality of tamper-proof seals against the computer-readable electronic data file.

8. The anti-counterfeiting system of claim 7, the tamper-proof seal further comprising a scannable optical identifier associated with one complete serial number.

9. The anti-counterfeiting system of claim 7, wherein the computerized database utilizes blockchain technology.

\* \* \* \* \*